United States Patent [19]

Parsons et al.

[11] Patent Number: 5,002,170

[45] Date of Patent: Mar. 26, 1991

[54] TORQUE RESPONSIVE CLUTCH CONTROL

[75] Inventors: David Parsons, Kenilworth; Charles J. Jones, Coventry, both of United Kingdom

[73] Assignee: Automotive Products plc, England

[21] Appl. No.: 469,433

[22] PCT Filed: Sep. 28, 1988

[86] PCT No.: PCT/GB88/00795

§ 371 Date: Apr. 6, 1990

§ 102(e) Date: Apr. 6, 1990

[87] PCT Pub. No.: WO89/03318

PCT Pub. Date: Apr. 20, 1989

[30] Foreign Application Priority Data

Oct. 7, 1987 [GB] United Kingdom ............... 8723547

[51] Int. Cl.$^5$ ............................................. F16P 21/04
[52] U.S. Cl. ............................. 192/0.092; 192/0.052
[58] Field of Search ....................... 192/0.052, 0.092

[56] References Cited

U.S. PATENT DOCUMENTS

| | | | |
|---|---|---|---|
| 4,518,064 | 5/1985 | Windsor | 192/0.052 |
| 4,565,267 | 1/1986 | Nishikawa et al. | 192/0.052 |
| 4,591,038 | 5/1986 | Asagi et al. | 192/0.092 |
| 4,618,043 | 10/1986 | Hattori et al. | 192/0.052 |
| 4,660,697 | 4/1987 | Yoneda et al. | 192/0.052 |
| 4,677,880 | 7/1987 | Hattori et al. | 192/0.052 |
| 4,874,070 | 10/1989 | Nellums et al. | 192/0.092 |

FOREIGN PATENT DOCUMENTS

| | | |
|---|---|---|
| 0092950 | 11/1982 | European Pat. Off. . |
| 0147228 | 7/1985 | European Pat. Off. . |
| 0130794 | 3/1988 | European Pat. Off. . |
| 69 (M-286) [1506] | 3/1984 | Japan . |
| 2058963 | 4/1981 | United Kingdom . |

Primary Examiner—Rodney H. Bonck
Assistant Examiner—Nicholas Whitelaw
Attorney, Agent, or Firm—Davis, Bujold & Streck

[57] ABSTRACT

The engine output torque of a motor vehicle is a function of the extent to which the throttle valve is open, the further the valve is open, the greater the throttle angle and the greater the output torque. Microprocessor based clutch control is provided to measure the throttle angle, determine the output torque, and automatically engage and disengage the clutch with respect to time. The clutch control also allows manual gear operation and clutch slip control.

15 Claims, 3 Drawing Sheets

TORQUE RESPONSIVE CLUTCH CONTROL

This invention concerns controlling operation of clutch means in a motor vehicle.

The motor vehicle is of a type (hereinafter called "the type referred to") comprising an internal combustion engine to generate engine torque, fuel supply means to supply fuel to the engine, said fuel supply means having a torque demand condition having a torque demand value which is selectively variable over a range of values extending from a minimum to a maximum demand for torque, the fuel supply means being controllable whereby the amount of fuel supplied is variable with variation in said torque demand value, and wherein the engine power output is increasable in response to increasing the fuel supply to said engine, drive line means to transmit rotary motion from the engine to at least one ground running wheel, said drive line means comprising changeable ratio gear means and clutch means between said engine and said gear means whereby the power output from the engine is input to the clutch means to be transmitted by the clutch means to give a power output providing a power input to the gear means, and said clutch means having a torque transmitting capacity which is variable between a predetermined maximum and zero whereby when the torque input to the clutch means exceeds the transmitting capacity clutch slip occurs and the power output is less than the power input to said clutch means, and control means for automatically causing a reduction of said torque transmitting capacity upon a demand for a change of ratio in said gear means being observed by said control means and for automatically increasing said torque transmitting capacity subsequent to the ratio change being effected.

In a first known form of motor vehicle of the type referred to the gear means, clutch means and control means all form a fully automatic gear box system in which gear ratio changes are automatically performed in response to signal inputs to the control means. The signal inputs represent, for example, engine speed and the torque demand value, and are provided from sensors. A gear ratio change takes place when the input signals have certain predetermined values.

In an automatic gearbox having a torque converter and a lock-up clutch, the torque transmitting capacity of the lock-up clutch may be merely reduced when a gear ratio change is required and performed, and subsequent to the ratio change the torque transmitting capacity of the lock-up clutch is increased again.

In a second known form of vehicle of the type referred to the clutch means and control means form a semi-automatic transmission system in which the vehicle has no clutch pedal but has a gearbox in which the gear ratio changes are performed or at least initiated by manual action by the driver. Gear ratio changes may be effected by the manual effort exerted by the driver moving a gear lever when the driver desires the gear ratio change to be made or the changes may be powered by motor means, for example electric or fluid powered motors or actuators in response the driver operating manual means, for example a lever, switch or push-button. The initiating and completing of such a gear ratio change are detected by sensor means and corresponding signals sent to the control means which automatically causes the torque transmitting capacity of the clutch means to be reduced to zero just before the ratio change and automatically restores torque transmitting capacity immediately after the ratio change. Whether or not a gear change is made is at the driver's discretion and irrespective of a fuel supply magnitude demand signal being sent, for example via a mechanical linkage from an accelerator pedal, to a control of the torque demand condition of the fuel supply means. To prevent the engine racing during a change of gear ratio the control means may also provide an override fuel supply magnitude demand signal (capable of overriding the signal from the accelerator pedal) to automatically ensure that the supply of fuel is of a low amount whilst the torque transmitting capacity of the clutch means is zero.

In the case of both the first and second forms of vehicle a jolt and vibrations can occur at tip-in. Tip-in is a situation where initially the vehicle is travelling forwards with the accelerator pedal in a position corresponding to a demand for a low supply of fuel to the engine (i.e. a low engine torque demand), and the vehicle is in a condition of over-run where the momentum of the vehicle is driving the engine; then the accelerator pedal is suddenly depressed or tipped-in by the driver. This causes a sudden increase in the supply of fuel to the engine and a rapid increase in engine output torque. Accordingly there is a sudden surge in the torque in the drive line means which causes free play in the drive line means to be taken up as the driving direction suddenly reverses from over-run to engine drive. It is this taking-up of free play which causes the jolt and vibrations, and these disturbances are felt by the driver who may find the experience a nuisance or disconcerting in addition to any damaging effect the disturbances may have on the drive line means.

An object of the invention is to provide a vehicle of the type referred to in which large torque surges in the drive line means at tip-in, or at some other sudden increase in demand for fuel from a low level of demand, are avoided or at least reduced.

According to the invention there is provided a motor vehicle of the type referred further comprising observing means to produce a torque demand value signal which is a function of said torque demand value said control means being responsive to said torque demand valuesignal and arranged to control the clutch means in a manner which produces a torque transmitting capacity in the clutch means which is a function of said torque demand value whereby at least below a predetermined magnitude of said torque demand value the torque transmitting capacity of said clutch means is less than said maximum, and the control mean being arranged such that whilst the vehicle continues to run in the same gear ratio and there is an occurrence of a said torque demand value signal signifying an increase in said torque demand value from a magnitude less than said predetermined magnitude the control means automatically responds to increase the torque transmitting capacity of the clutch means such that during at least part of the time of said increase the torque transmitting capacity of the clutch means is less that the output torque from the engine whereby slipping of said clutch means occurs.

In the fuel supply means, the torque demand condition at any instant may be (or may be a function of) the attitude or position of a relatively movable component part of the fuel supply means, the position of which component part is a function of the amount of fuel being supplied. For example, in the case of a petrol driven engine, the fuel supply means may comprise a carburetor or a fuel injection system. In either case the torque demand condition can be the attitude of a throttle valve controlling the size of a throttle opening or can be the size of the throttle opening. For example, the torque demand value corresponding to the minimum demand for torque can correspond to the throttle opening being of a minimum size set by the throttle valve, i.e., 0% throttle and the torque demand value corresponding to a maximum demand for torque can correspond to the throttle opening being of maximum size set by the throttle valve, i.e., 100% throttle. When the engine is a diesel engine the fuel supply means may comprise a fuel pump in which the torque demand value of the torque demand condition may be represented by or be a function of the condition or position of the rack. In the case of both petrol and diesel engines, the torque demand value can be represented by or be a function of the accelerator pedal position at any instant with respect to a reference position for the pedal.

The invention will now be further described, by way of example, with reference to the accompanying drawings in which.

In the drawings like or similar parts are identified by the same reference numerals.

Figures 5, 6:
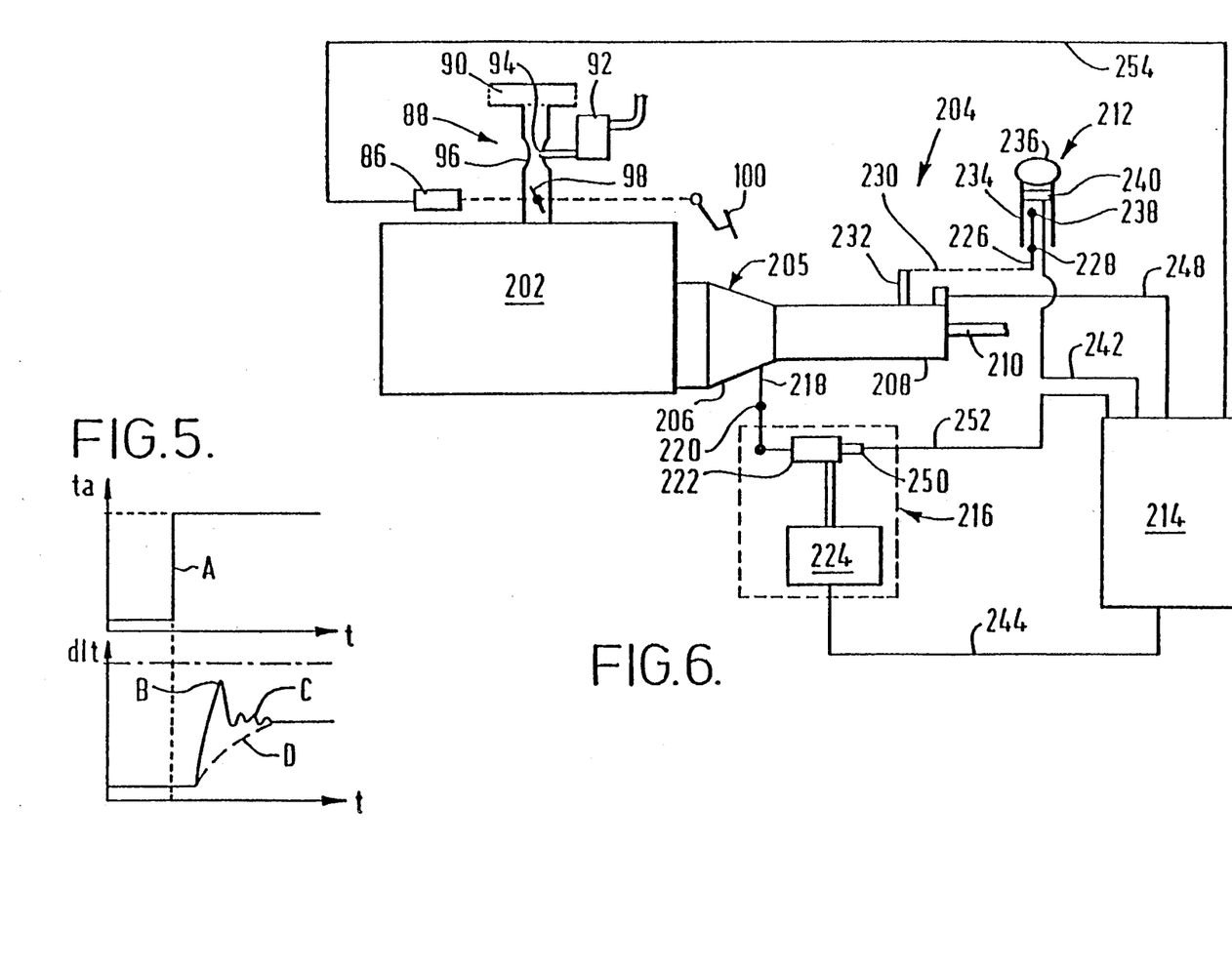
FIG.5 is a set of diagrams or graphical representations, of variation of throttle angle ta and drive line torque dlt with respect to time t, and illustrate in full lines a sudden increase in drive line torque dlt in response to a sudden increase in demand for fuel at tip-in in a known motor vehicle; the torque shown in dash line illustrating an objective it is desired to aspire towards in a motor vehicle formed according to the invention.
FIG. 6 shows a modification which can be applied to the vehicle in FIG.1 and is a diagrammatic illustration partly in section of an internal combustion engine with fuel supply means and drive line means comprising a semi-automatic transmission.

With reference to FIG.5, in a known motor vehicle of the type referred to in which fuel and air is supplied to the internal combustion engine by means of a carburetor, the carburetor has a throttle comprising an induction passage which can be opened and closed by varying amounts by a butterfly throttle valve. The extent to which the passage is opened or closed being the throttle size determined by the position or angle (throttle angle ta), between maximum and minimum values, of the throttle valve i.e. the greater the throttle angle the greater the throttle size, and therefore the greater the value of the torque demand condition in the fuel supply means comprising the carburetor. The amount of fuel and air supplied to the engine via the throttle is in a direct proportion to the throttle angle. At tip-in the throttle angle ta is suddenly increased as indicated at A in FIG. 5, the consequence on drive line torque dlt is a torque surge spike B and torque fluctuation C causing the aforementioned jolt and vibrations.

With a view to ironing out the torque spike B and fluctuations C, the motor vehicle to be described with reference to FIGS. 1 to 4 endeavours at tip-in, to increase drive line torque dlt in accordance with dash part D (FIG.5).

VEHICLE WITH AUTOMATIC TRANSMISSION

Figures 1, 2:
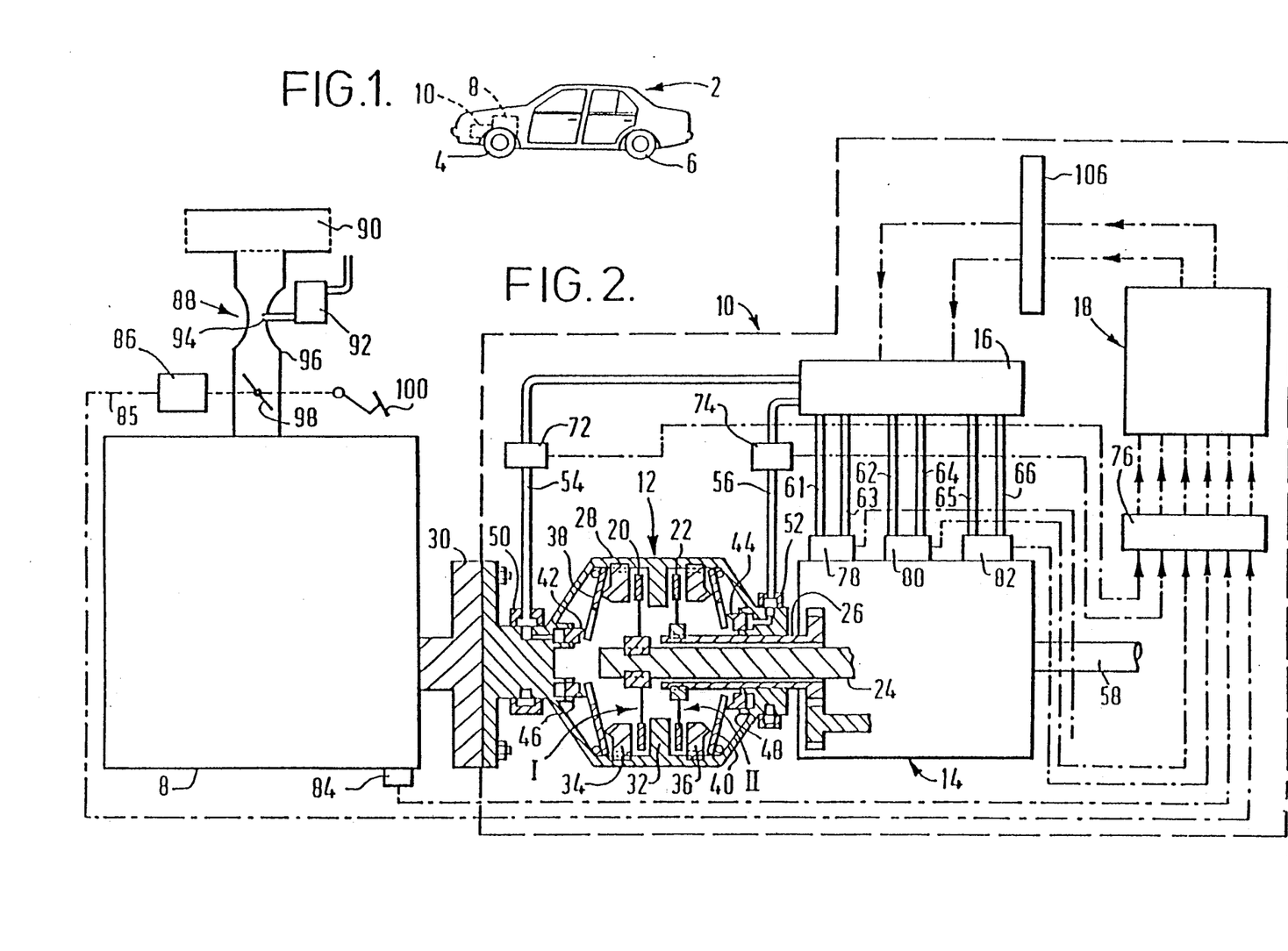
FIG. 1 is a diagrammatic illustration of a motor vehicle formed according to the invention.
FIG. 2 is a diagrammatic illustration partly in section of an internal combustion engine with a carburetor, and drive line means comprising an automatic gear box for the vehicle in FIG.1.

Referring now to FIGS. 1 and 2, a motor vehicle 2 has front ground running wheels 4, rear wheels 6, an internal combustion engine 8 and drive line means comprising an automatic gear box 10 driving the two front wheels 4 (only one shown). In addition or alternatively, the rear wheels could be driven.

The automatic gear box 10 comprises a clutch system 12, a gear box 14, an hydraulic control 16, and an electronic control 18 comprising computer means containing a predetermined controlling program.

The clutch system 12 is a twin clutch system represented purely illustratively and may be of the wet plate kind. It has a pair of driven clutch plates 20 and 22 each splined to a respective gear box input shaft 24 and 26. The clutch system has a rotatable cover 28 secured to rotate with an engine fly-wheel 30. Both rotationally and axially fast with the cover 28 is an annular clutch counter-pressure plate 32. A pair of annular clutch pressure plates 34 and 36 are splined at their peripheries to the cover 28 so as to be rotationally fast therewith but axially slidable relatively to the cover. Diaphragm springs 38 and 40 are arranged for acting respectively on the pressure plates 34 and 36. Associated with each spring 38, 40 is a respective thrust member 42 or 44 formed as an annular piston sliding in a respective hydraulic cylinder 46 or 48 at each end of the clutch cover 28. The clutch cover 28 can rotate relatively to the shafts 24 and 26 and relatively to stationary, annular, hydraulic supply cuffs 50 and 52 enabling the supply of hydraulic pressure to the cylinders 46 and 48 respectively via conduits 54 and 56 and the relief of hydraulic pressure in the cylinders also via the conduits. Accordingly, applying hydraulic pressure to the cylinder 46 urges the thrust member 42 which pushes the diaphragm spring 38 which urges the pressure plate 34 to clamp the clutch driven plate 20 against the counter-pressure plate 32. Since the torque transmitting capability or capacity of engaged clutch 34, 20, 32 (hereinafter called Clutch I) is directly proportional to the force with which the driven plate 20 is clamped against the counter-pressure plate 32 it follows that the torque transmitting capacity of the engaged Clutch I is directly proportional to the hydraulic pressure in the cylinder 46, i.e. the greater the hydraulic pressure the greater the torque transmitting capacity. Relieving the hydraulic pressure in the chamber 46 allows the Clutch I to disengage and eventually reduces its torque transmitting capacity to zero. The other clutch 36, 20, 32 (hereinafter called Clutch II) is operated by applying and relieving hydraulic pressure via conduit 56, the operation of Clutch II being substantially similar to that of Clutch I. When the Clutch II is engaged it has some torque transmitting capacity, and torque up to the value of that capacity can be input to the gear box 14 by the sleeve shaft 26. Whereas if Clutch I is engaged torque up to its capacity value can be input to the gear box 14 by the shaft 24.

The change speed gear box 14 is represented diagrammatically and symbolically and can provide six selectable gear ratio changes each giving a corresponding torque output on output shaft 58 for transmission to the road wheels 4. The six changeable ratios constitute first, second, third, fourth, fifth and reverse gears. The gear box 14 includes hydraulically operated gear engagement means (not shown) operated in accordance with the hydraulic pressures obtaining in conduits 61, 62, 63, 64, 65 and 66 as controlled by the hydraulic control 16 also connected to the conduits 54 and 56.

The arrangement is such that when any one of the first, third or fifth gear is engaged the vehicle is only driven by that gear when Clutch I is engaged, and when any one of the second, fourth or reverse gear is engaged the vehicle is only driven by that engaged gear when Clutch II is engaged. Also the controls 16 and 18 are arranged so that when Clutch I engages, Clutch II automatically disengages and vice-versa.

Hydraulic pressure sensors 72 and 74 ar provided in the conduits 54 and 56 to provide electrical signals indicative of the fluid pressures obtaining in those conduits, the electrical signals being transmitted to an interface 76. Associated with the gear box 14 are gear engaged indicators 78, 80 and 82 transmitting to the interface 76 electrical signals indicating which of the first, second, third, fourth, fifth or reverse gears has/have been engaged. The interface 76 further receives from transducer 84 an electrical signal indicative of the engine speed and on channel 85, from transducer 86 an electrical signal indicative of throttle opening size in fuel supply means 88 formed by a carburetor with an air filter 90. The carburetor comprises a float chamber 92, a fuel jet 94 and a throttle comprising an induction passage 96 containing a pivotable throttle valve 98. The vehicle has an accelerator pedal 100 which can be connected mechanically by known means to the throttle valve 98 so that the more the pedal is depressed the more the throttle valve is rotated away from its position corresponding to minimum throttle opening towards its position of maximum throttle opening, the valve 98 returning towards its minimum throttle position as the pedal is released. For any given engine speed the more the throttle is opened the greater the amount of fuel and air supplied to the engine 8. The throttle at minimum size may be referred to as 0% throttle or the throttle valve 98 as being at 0° throttle angle. At maximum size the throttle may be referred to as 100% throttle, the throttle valve 98 having been rotated through its greatest extent, for example about 80° or so, from its minimum throttle position to open wide the passage 96; i.e. passage 96 is wide open at a throttle angle of 80° or so. Therefore the transducer 86 may be arranged to observe the angular position of the throttle valve 98, relative to its position at minimum throttle size and provide an electrical signal indicative of the relative angular position of the throttle valve (throttle angle) and thus indicative of the size of the throttle opening which is thus indicative of the amount of fuel and air being supplied to the engine 8. Alternatively since there is a correspondence between the size of the throttle opening and the position of the accelerator pedal 100, the transducer 86 could be arranged to observe the position of the pedal and provide the signal indicative of throttle opening size corresponding to the. pedal position. Instead of a mechanical (or hydraulic) link between the pedal 100 and the throttle valve 98 the link could be of a kind wherein the throttle valve 98 is rotated by motor means, for example an electric motor, in response to electric or other signals produced by a signal generator in accordance with the position of the accelerator pedal 100.

Figures 3, 4:
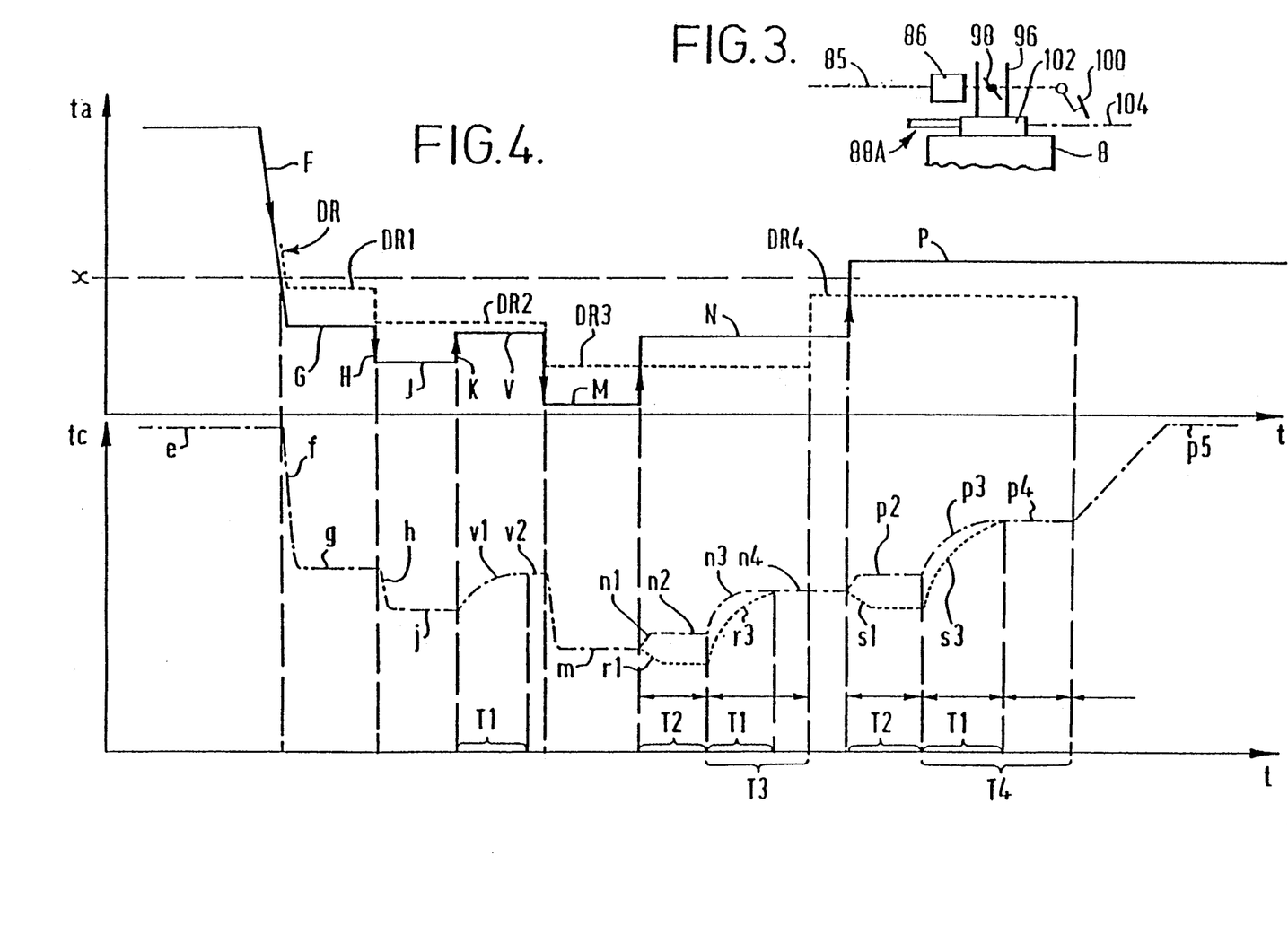
FIG.3 is a fragment diagrammatically illustrating a modification to the arrangement in FIG.2 wherein the carburetor is replaced by fuel injection means.
FIG. 4 is a set of diagrams or graphical representations illustrating operation of the clutch means in relation to the throttle opening size in the vehicle formed according to the invention in FIG.1.

The alternative fuel supply means 88 A in FIG.3 is a fuel injection system in which fuel injector means 102 in response to signals on 104 from an electronic control, for example the control 18, supplies fuel to the engine 8 in amounts directly proportional to the size of the throttle opening as determined by the angular position of the throttle valve 98 observed by the transducer 86.

Interface 76 may be arranged to digitise or otherwise render the electrical signal inputs thereto compatable with the computer 18 to serve as data inputs to the latter. Output signals from computer 18 are input to an interface 106 which converts them to signals, for example analogue signals, compatable with the hydraulic control 16.

The computer control 18 is loaded with a program comprising gear ratio running and gear ratio changing maps which, in accordance with the engine speed and throttle angle data supplied to control 18, determines through which gear ratio drive is required of any instant. Control 18 also anticipates in the case of drive through second, third and fourth gears which is the next likely gear ratio (up or down) through which drive will be required and causes that ratio to be engaged whilst the Clutch I or II corresponding to that ratio is in a disengaged state. In the case of driving through the first gear ratio, the second gear ratio is caused to be automatically in engagement by the control 18 in readiness (Clutch II being in disengaged state). Whereas when driving is through the fifth gear ratio the control 18 automatically causes the fourth gear ratio to be in engagement in readiness (Clutch II being again in disengaged state). If, for example, driving is through the second gear ratio the computer control 18 has caused hydraulic control 16 to apply hydraulic pressure on conduit 62 to engage the second gear ratio and has caused the relief of hydraulic pressure in conduit 54 so that Clutch I is disengaged and the application of pressure on conduit 56 to engage Clutch II. In relation to the program maps the computer control analyses the engine speed and throttle angle data it continuously receives and determines what is the next likely gear change to be needed. If it is to be a change up then the computer control 18 instructs the hydraulic control 16 to supply pressure on conduit 63 to engage the third gear ratio. If the data inputs to computer 18 eventually satisfy the program criteria corresponding to running in third gear, the computer instructs hydraulic control 16 to relieve the pressure in conduit 56 so that Clutch II disengages whilst simultaneously applying pressure on conduit 54 to engage Clutch I. Therefore driving ceases to be through second gear and becomes established through third gear.

Manual means (not shown) can be provided to operate the hydraulic control 16 to cause the engagement of the reverse gear ratio by pressure on conduit 66 and the engagement of Clutch II when drive through reverse gear is required.

In the automatic gear box 10, the torque transmitting capacity of Clutch I or Clutch II is directly proportional to the hydraulic pressure in cylinder 46 or 48 respectively. That hydraulic pressure is a function of both the engine speed and the throttle angle and is provided by the hydraulic control 16 under instructions from computer control 18 programmed to instruct the desired hydraulic pressure in accordance with the engine speed and throttle angle data the computer receives, when gear changing is taking place or the vehicle is running in any gear ratio.

When the vehicle is running in any gear ratio the torque transmitting capacity of the corresponding Clutch I or II has a predetermined maximum value (capable of transmitting the maximum engine output torque to the gear box 14) in consequence of applying a predetermined maximum hydraulic pressure to the cylinder 46 and 48.

TIP-IN CONTROL

In FIG. 4 variation in throttle angle ta and clutch torque transmitting capacity tc are shown with respect to time t.

With reference to FIG.4, if one takes as an example that the vehicle is running in fourth gear, section e of the torque diagram shows that Clutch II has the aforesaid predetermined maximum torque transmitting capacity due to the pressure in cylinder 48 being at the predetermined maximum. Furthermore it will be assumed that the engine speed remains within a predetermined speed range such that the computer 18 will not instruct a gear change.

If the driver releases the accelerator pedal the throttle angle ta decreases as signified by section F in FIG.4. A throttle angle value x is predetermined or selected being an appropriate maximum throttle angle below which the occurrence of transmission line disturbance, in consequence of a sudden increase in throttle angle, is to be eliminated or at least reduced. The throttle angle x can be called the "tip-in threshold" and may be a few degrees, for example substantially 10°. When the throttle angle ta decreases to at least the "tip-in threshold" a section of program, in computer 18, provided for tip-in control comes into effect. As a result, below the tip-in threshold the torque transmitting capacity of the clutch is modulated by the throttle angle, and the computer calculates a detect reference DR which (for the time being) may be simply understood as a numerical value equal to the throttle angle plus a small positive, numerical "detect off-set". That detect off-set is a predetermined number of angular degrees, for example substantially 2°. For a throttle angle of 7° the calculated detect reference would be 9° (i.e. 7°+2°). Therefore as the throttle angle decreases in accordance with section F in FIG. 4, when it falls below the tip-in threshold x the computer 18 instructs the hydraulic control 16 to relieve pressure in clutch cylinder 48 (FIG.2) to reduce the torque capacity tc of Clutch II as indicated by diagram section f until it reaches a constant value at section g for the constant throttle angle at section G for which the computer has also established the detect reference value shown by section DR1. The value of the torque capacity below tip-in threshold at any constant throttle angle is calculated by the computer 18 and controlled thereby in accordance with the throttle angle and engine speed data so that the torque capacity of the Clutch II is slightly greater than the torque input thereto from the gear box to drive the engine; i.e. the torque capacity of the clutch is just enough to transmit the torque which is input into the clutch.

If the throttle angle is reduced again as shown at section H in FIG.4 to a constant value represented at section J, the clutch torque capacity is quickly dropped further through section h to the value at section j and a new lower detect reference DR2 is established in the computer 18.

Should, for example, the throttle angle now be suddenly increased slightly, as indicated at section K, by an amount less than the detect off-set, the level of the detect reference is maintained at DR2 even though the throttle angle at the steady section V is greater than a J. However, the computer control responds to the increase in throttle angle and over a time constant T1 causes the hydraulic control 16 to increase the hydraulic pressure in cylinder 48 (FIG.2) substantially exponentially to increase the clutch torque capacity at a controlled substantially exponential rate as represented at section v1 for example, up to a steady value represented at section v2.

Whilst the clutch torque capacity is being increased in accordance with section v1 it is possible that some clutch slip may occur before the capacity represented by v2 is substantially attained. The time duration T1 can be small for example substantially in the range of 300.0 milliseconds to 500.0 milliseconds, preferably substantially 300 millseconds.

Should the throttle angle be reduced to a smaller value represented by section M, then, because this is a reduction in throttle angle, the computer 18 calculates a new detect reference value shown at DR3, which is smaller than DR2. Also the torque transmitting capacity of the clutch is ramped down quickly to the throttle angle modulated level at section m.

Increasing the throttle angle suddenly to a steady value represented by section N gives the throttle angle a value greater than the current detect reference DR3 but less than the tip-in threshold. Immediately the throttle angle is increased, the computer control begins to cause some very small increase (section n1) in clutch torque transmitting capacity. But at the same time the computer control initiates timer means to measure a time duration T2. Because the computer control observes that the throttle angle has increased above the detect reference, the aforementioned increase in clutch torque capacity is rapidly stopped and the time delay T2 brought into effect. Therefore the clutch torque capacity is held at a low steady level (section n2) until the relatively short time delay T2, for example substantially 100.0 milliseconds, expires. Then the computer control 18 causes the torque transmitting capacity of the clutch to increase over the time T1, substantially exponentially (as indicated by section n3) up to a steady value indicated at section n4. The controlled rate of increase at n3 delays the time that the required torque capacity of n4 is attained. Consequently during the increase at n3 the torque transmitting capacity of the clutch is less than the capacity needed to transmit all the power which is input to the clutch. Thus at section n3 clutch slip occurs to reduce the chance of transmitting torque surge to the gear box from the engine.

When a driver suddenly presses on the accelerator to rapidly increase the throttle angle, there is a short delay before the increased charge of fuel and air reaches the engine. Thus there is a short delay before the engine produces the torque surge due to that increased charge. By introducing the time delay T2 to hold down the torque transmitting capacity of the clutch for that time delay, there is a greater chance that the torque surge from the engine will coincide with the controlled rate of increase in torque capacity at n3 so that the clutch slip is more likely to occur at the time of the surge. Therefore tranmission of the surge by the clutch should not occur.

When the timer means in the computer 18 measuring the time delay T2 times out, two further timer means commence in the computer. One measures the time T1 and the other measures time duration T3 which is the reset detect reference time. At the end of reset time T3, the detect reference is increased by the computer control to its new value DR4. T3 is not shorter than T1 and is preferably longer, for example substantially 500.0 milliseconds.

Regarding the detect reference DR4 and the detect references DR1, DR2 and DR3, it will be understood that whilst the throttle angle remains not greater than each of the tip-in threshold and the detect reference, then each time the throttle angle drops below its previous minimum value the detect reference is set at a new lower level. Whereas whilst the throttle angle remains below the tip-in threshold, a new increased detect reference is only set by the throttle angle being increased above the current detect reference.

Also when an increase in throttle angle is less (such as represented by section K) than the detect off-set, no time delay T2 is introduced before the torque transmitting capacity of the clutch is increased at the controlled rate over the time T1.

Taking a case where the throttle angle, for example as represented at section N (FIG.4), is below both the tip-in threshold x and the detect reference, for example DR4, now if the throttle angle is suddenly increased to a value (such as represented by section P) above both the detect reference and the tip-in threshold, this can be considered as tip-in proper. Because the throttle angle increases above the tip-in threshold DR4 the time delay T2 comes into operation and the clutch torque transmitting capacity is held down as represented by section p2. When the delay T2 expires the clutch torque transmitting capacity is increased by the computer control 18 substantially exponentially, as represented by section p3, over the time T1 up to the value represented by section p4 which again is just greater than that needed by the clutch to transmit all the power which is input thereto. Thus again whilst the torque transmitting capacity is being increased in accordance with section p3 clutch slip occurs to reduce the chance of transmitting torque surges from engine to gear box. At the same time as one of the timer means starts to measure the time T1, other timer means in the computer starts to measure a time T4 (which is relatively long, for example substantially 1.0 second) because the throttle angle is now in excess of the tip-in threshold. When time T4 expires computer control 18 exits from the section of program concerned with tip-in control and, under instruction from another program section, ramps up the torque transmitting capacity of the clutch to the predetermined maximum represented at section p5. Furthermore, because the throttle angle is now above the tip-in threshold no new detect reference is calculated and reference DR4 goes void at the expiry of timeout T4.

In a modification of the control which can come into effect when the throttle angle is increased above the detect reference (if the increase in throttle angle is measured by the computer 18 as being in excess of a predetermined rate) then whilst the delay time T2 is being measured out the torque transmitting capacity of the clutch is dropped (as represented by dotted sections r1 or s1) to a value less than the capacity which was needed to transmit all the power input to the clutch immediately before the increase in throttle angle. On the delay T2 expiring, the clutch torque transmitting capacity is increased at a controlled exponential rate shown at dotted section r3 or s3 up to the aforementioned values at n4 or p4. By so dropping the torque capacity and then increasing it in the controlled manner, the chance of the transmission of torque surges from the engine is much reduced. It is believed that this modification should only be used for relatively high rates of increase of the throttle angle. If it were used at low rates of increase, it might be detrimental to the engine braking effect during over-run.

With reference to FIG.4 the tip-in control has been described with reference to operation of the Clutch II whilst the vehicle is running in fourth gear, tip-in control can be applied in comparable manner to the operation of Clutch II whilst the vehicle is in second gear and to the operation of the Clutch I when the vehicle is running in first, third or fifth gear.

VEHICLE WITH SEMI-AUTOMATIC TRANSMISSION

The semi-automatic transmission concerned is of a kind (hereinafter called the kind referred to) comprising change-speed gear means having a plurality of mutually exclusive selectable gear ratio means, gear ratio selection means operable when desired by the driver to select a desired said gear ratio, clutch means interposed between the engine and a rotary motion input shaft to said change-speed gear means, and clutch control means to automatically disengage said clutch means upon occurrence of a gear ratio change demand signal initiated by the driver and to automatically re-engage said clutch means upon subsequent occurrence of a gear ratio selection.

With reference to FIG. 6 an internal combustion engine is shown at 202, and at 204 a semi-automatic transmission of the kind referred to for a motor vehicle. The transmission comprises a clutch 205, for example a diaphragm spring clutch, within a bell-housing 206 and a change-speed gearbox 208 having an output shaft 210 for supplying rotary drive to one or more road wheels, and a rotary motion input shaft (not shown) on which is mounted in known manner a clutch driven plate. Gearbox 208 comprises a plurality of mutually exclusively selectable gear ratios (know per se) any desired one of which is selectable (in the course of a driver making a gear change) by a suitable pre-determined manual movement of a gear shift lever 212 to dis-engage or de-select the said ratio currently selected and then select or engage any desired said gear ratio. A clutch control for automatically engaging and disengaging the clutch comprises an electronic control 214 and a fluid flow control 216. The electronic control comprises computer means. The clutch is disengaged and re-engaged using a release lever or fork 218 pivoted at 220 and interacting in known manner with the clutch. A fluid pressure piston and cylinder unit or actuator 222 acts on the lever 218 so that the rate and degree of engagement or disengagement of the clutch at any instant is controlled by the amount of fluid in the actuator 222. The amount of fluid, which may be hydraulic fluid, acting in actuator 222 is controlled by a fluid pressure supply and control system 224 forming the fluid flow control 216 with the actuator. Shift lever 212 includes a shaft 226 provided with a known gear lever pivot 228 permitting the shift lever a degree of universal movement. Shaft 226 is connected by any means 230 known per se for conveying movement of the shift lever 212 to a selection crank arm 232 causing selection and deselection of any desired said gear ratio when the shift lever 212 is moved according to the gear shift pattern. In addition to the shaft 226 the gear shift lever 212 also comprises a tube 234 (shown in section) surmounted by a knob 236. Tube 234 is mounted by a pivot 238 on the shaft 226. Knob 236 is intended for application of manual force directly thereto by the hand of the driver, for changing gear. When no manual force is applied the tube 234 adopts a centralised or initial position with respect to the shaft 226 under the action of resilient means (not shown) acting between the shaft and tube. On the other hand when sufficient manual force is applied to the knob 236 the tube 234 initially tilts slightly relative to the lever 226, about pivot 238, before the lever 226 is moved by further force on the tube to move the selection crank arm 232. This initial tilting of the tube 234 is taken as indicating a wish by the driver to change gear, and tilt sensor means 240 gives a tilt signal on channel 242 when a tilt has occurred. In response the electronic control 214 gives an output disengage clutch signal on channel 244 causing clutch control 216 to automatically disengage the clutch 205, thereafter, selection of any desired gear ratio is observed by sensor 246 providing a gear selection completed signal on channel 248. In response the control 214 gives an output re-engage clutch signal on channel 244 causing the control 216 to automatically re-engage the clutch 205.

The extent of clutch engagement or torque transmitting capacity of the clutch 205 is a function of the fluid pressure prevailing in the actuator 222 which is provided with a pressure sensor 250 to provide an output signal on channel 252 corresponding to the torque transmitting capacity of the clutch. Alternatively this same information could be provided by a sensor observing the position of a piston in the actuator 222 or observing the attitude of the release fork 218. Throttle transducer 86 provides signals on channel 254 representative of the throttle opening size.

The computer in the electronic control 214 is programmed to vary the torque transmitting capacity of the clutch 205 in the same manner as the torque transmitting capacity tc is varied as described above with reference to FIG.4 when the throttle angle in the system in FIG. 6 is varied in like manner to the variation of the throttle angle ta in FIG.4.

If desired the selection crank arm 232 can be moved to change gear by motor means or by fluid pressure operated actuator means. In either case the motor means or the actuator means respond to control means responsive to manual operation, by the driver, of lever, switch, or push-button means.

It will be appreciated that if the engine 8 or 202 is a diesel engine then the fuel supply means 88 in the form a carburetor in FIG.2 and 6 would be replaced by an in injection and fuel pump system controlled by an accelerator pedal. In most cases the transducer 86 could be arranged to observe the attitude or position of either a fuel rack or a control therefore or to observe the position of the accelerator pedal.

VEHICLE WITH ALTERNATIVE AUTOMATIC GEARBOX

In a motor vehicle having an automatic gearbox with a torque convertor and an hydraulically operated lock-up clutch, that clutch can be slipped at tip-in and operated in a manner similar to that shown in and described above with reference to FIG.4.

We claim:

1. A motor vehicle comprising:
   an internal combustion engine to generate engine torque,
   fuel supply means to supply fuel to the engine, said fuel supply means having a torque demand condition having a torque demand value which is selectively variable over a range of values extending from a minimum to a maximum demand for torque, the fuel supply means being controllable whereby the amount of fuel supplied is variable with variation in said torque demand value, and wherein the engine power output is increasable in response to increasing the fuel supply to said engine,
   drive line means to transmit rotary motion from the engine to at least one ground running wheel, said drive line means comprising changeable ratio gear means and clutch means between said engine and said gear means whereby the engine power output is input to the clutch means to be transmitted by the clutch means to give a power output providing a power input to the gear means, and said clutch means having a torque transmitting capacity which is variable between a predetermined maximum and zero whereby when the torque input to the clutch means exceeds the transmitting capacity clutch slip occurs and the power output is less than the power input to said clutch means, and
   control means for automatically causing a reduction of said torque transmitting capacity upon a demand for a change of ratio in said gear means being observed by said control means and for automatically increasing said torque transmitting capacity subsequent to the ratio change being effected,
   and observing means to observe and produce a tip-in signal which is a function of said torque demand value, said control means being responsive to said torque demand value signal and arranged to control the clutch means in a manner which produces a torque transmitting capacity in the clutch means which is a function of said torque demand value whereby at least below a predetermined magnitude of said torque demand value the torque transmitting capacity of said clutch means is less than said maximum, and the control means being arranged such that whilst the vehicle continues to run in the same gear ratio and there is an occurrence of a said tip-in signal signifying an increase in said torque demand value from a magnitude less than said predetermined magnitude the control means automatically responds to increase the torque transmitting capacity of the clutch means such that during at least part of the time of said increase the torque transmitting capacity of the clutch means is less than the output torque from the engine whereby slipping of said clutch means occurs.

2. A motor vehicle as claimed in claim 1, wherein in response to occurrence of a said tip-in signal said control means automatically causes an increase in the torque transmitting capacity of the clutch means over a predetermined period of time.

3. A motor vehicle as claimed in claim 1 wherein when the torque demand value is less than said predetermined magnitude said control means is arranged to set the torque transmitting capacity to the clutch means at a value which is slightly more than that needed for the clutch means to transmit the power which is being input to the clutch means and on occurrence of a said tip-in signal said control means is arranged to respond to increase the clutch torque transmitting capacity from a value set before said occurrence to an increased set value.

4. A motor vehicle as claimed in claim 1 wherein the rate of increase in torque transmitting capacity of the clutch means is substantially an exponential increase in capacity with respect to time.

5. A motor vehicle as claimed in claim 1 wherein said control means (16, 18; 214, 216) is arranged such that at the occurrence of a said tip-in signal the increase in clutch torque transmitting capacity is substantially initiated after a time delay from the occurrence of said tip-in signal.

6. A motor vehicle as claimed in claim 1 wherein the control means is arranged to respond to an occurrence of a said tip-in signal to reduce the torque transmitting capacity of the clutch means before said torque transmitting capacity is automatically increased as a consequence of the occurrence of said tip-in signal.

7. A motor vehicle as claimed in claim 6, wherein the rate of said increase in the torque transmitting capacity of the clutch means is substantially an exponential increase in capacity with respect to time subsequent to said decrease in torque transmitting capacity of the clutch means caused by said control means responding to the occurrence of a said tip-in signal.

8. A motor vehicle as claimed in claim 6 wherein said reduction in torque transmitting capacity occurs during a predetermined time delay.

9. A motor vehicle as claimed in claim 5 wherein said time delay is of a predetermined duration.

10. A motor vehicle as claimed in claim 1 wherein when the torque demand value is less than said predetermined magnitude the control means is arranged to establish a detect reference DR having a value which is a predetermined function of the torque demand value and greater than said torque demand value.

11. A motor vehicle as claimed in claim 10 wherein said control means is arranged such that at the occurrence of a said tip-in signal the increase in clutch torque transmitting capacity is substantially initiated after a time delay from the occurrence of said tip-in signal and the control means is arranged so that said time delay occurs in consequence of said tip-in signal being produced by the torque demand value increasing to a value at least equal tot he detect reference.

12. A motor vehicle as claimed in claim 10 wherein the control means is arranged so that when the detect reference value current at the time of an occurrence of a said tip-in signal is exceeded by the increased torque demand value then after a time delay from said occurrence of said tip-in signal the control means establishes a new detect reference having an increased value which is a said function of the increased torque demand value.

13. A motor vehicle as claimed in claim 10 wherein provided the torque demand value remains below the detect reference value, the detect reference value is a said function of the smallest torque demand value to which the torque demand value has been reduced.

14. A motor vehicle as claimed in claim 1 wherein the vehicle is provided with an automatic system for automatically changing from one gear ratio to another in said changeable ratio gear means, during travel of the vehicle.

15. A motor vehicle as claimed in claim 1 wherein the drive line means comprises a semi-automatic transmission for changing from one gear auto to another during travel of the vehicle, said semi-automatic transmission comprising change-speed gear means having a plurality of mutually exclusive selectable gear ratio means, gear ratio selective means operable when desired by the driver to select a desired said gear ratio, clutch means interposed between the engine and a rotary motion input shift to said change-speed gear means, and clutch control means to automatically disengage said clutch means upon occurrence of a gear ratio change demand signal initiated by the driver and to automatically reengage said clutch means upon subsequent occurrence a gear ratio selection.

* * * * *

UNITED STATES PATENT AND TRADEMARK OFFICE
CERTIFICATE OF CORRECTION

PATENT NO. : 5,002,170

DATED : March 26, 1991

INVENTOR(S) : David PARSONS & Charles John JONES

It is certified that error appears in the above-identified patent and that said Letters Patent is hereby corrected as shown below:

Column 14, line 6 change "tot he" to --to the--;
line 27 change "auto" to --ratio--;
line 31 change "selective" to --selection--; and
line 34 change "shift" to --shaft--.

Signed and Sealed this

Fourth Day of August, 1992

Attest:

DOUGLAS B. COMER

*Attesting Officer*       *Acting Commissioner of Patents and Trademarks*